(12) United States Patent
Ferguson et al.

(10) Patent No.: US 9,827,669 B2
(45) Date of Patent: Nov. 28, 2017

(54) ROBOTIC TORSO SENSING SYSTEM AND METHOD

(71) Applicant: Fetch Robotics, Inc., San Jose, CA (US)

(72) Inventors: Michael Ferguson, San Jose, CA (US); Melonee Wise, San Jose, CA (US); Derek King, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 41 days.

(21) Appl. No.: 15/135,449

(22) Filed: Apr. 21, 2016

(65) Prior Publication Data

US 2017/0305011 A1 Oct. 26, 2017

(51) Int. Cl.
G05B 19/04 (2006.01)
B25J 9/16 (2006.01)
G06F 3/06 (2006.01)

(52) U.S. Cl.
CPC .......... B25J 9/161 (2013.01); B25J 9/1664 (2013.01); B25J 9/1671 (2013.01); G05B 2219/40479 (2013.01); G06F 3/0614 (2013.01)

(58) Field of Classification Search
CPC ........ B25J 9/161; B25J 9/1664; B25J 9/1671; G05B 2219/40479; G06F 3/0614
See application file for complete search history.

(56) References Cited

U.S. PATENT DOCUMENTS

| | | | | |
|---|---|---|---|---|
| 2008/0044262 A1* | 2/2008 | Kim | ..................... | B65G 1/0421 414/273 |
| 2010/0316469 A1* | 12/2010 | Lert | ...................... | B65G 1/045 414/273 |
| 2014/0308098 A1* | 10/2014 | Lert | ..................... | B65G 1/0492 414/281 |
| 2015/0032252 A1* | 1/2015 | Galluzzo | .................. | B25J 5/007 700/218 |
| 2015/0081089 A1* | 3/2015 | Kapust | ................. | B65G 1/0492 700/218 |
| 2015/0360882 A1* | 12/2015 | Girtman | ................. | B65G 59/02 700/213 |
| 2016/0101940 A1* | 4/2016 | Grinnell | ............... | G05D 1/0297 700/216 |

* cited by examiner

*Primary Examiner* — Ian Jen
(74) *Attorney, Agent, or Firm* — J. Steven Svoboda (57) ABSTRACT

A robotic torso sensing system and method includes: a robotic torso comprising a mobile torso, the robotic torso further comprising a fixed torso; a motor configured to move the mobile torso; a torso encoder configured to provide information to the motor; a master controller operably connected to the motor, the master controller configured to control the motor, the master controller operably connected to the torso encoder, the master controller further configured to control the mobile torso; and a sensor configured to measure a position of the mobile torso, the sensor further configured to transmit the measurement to the master controller.

51 Claims, 7 Drawing Sheets

ROBOTIC TORSO SENSING SYSTEM AND METHOD

PRIORITY CLAIM

The present application claims the priority benefit of U.S. provisional patent application No. 62/150,384 filed Apr. 21, 2015 and entitled "Robotic Torso Sensing Apparatus," the disclosure of which is incorporated herein by reference.

SUMMARY

Embodiments of this invention relate in general to a robotic torso sensing system and method.

A robotic torso sensing system and method includes: a robotic torso comprising a mobile torso, the robotic torso further comprising a fixed torso; a motor configured to move the mobile torso; a torso encoder configured to provide information to the motor; a master controller operably connected to the motor, the master controller configured to control the motor, the master controller operably connected to the encoder, the master controller further configured to control the mobile torso; and a sensor configured to measure a position of the mobile torso, the sensor further configured to transmit the measurement to the master controller.

A robotic torso sensing system includes: a robotic torso comprising a mobile torso, the robotic torso further comprising a fixed torso; a motor configured to move the mobile torso; a motor controller operably connected to the motor, the motor controller configured to control the motor; a torso encoder configured to provide information to the motor; a torso controller operably connected to the torso encoder, the torso controller operably connected to the motor controller, the torso controller configured to control the mobile torso; and a sensor configured to measure a position of the mobile torso, the sensor further configured to transmit the measurement to the torso controller.

A robotic torso sensing method includes: storing, by a master controller, a measurement by a sensor of a number of rollout regions traversed by a mobile robotic torso; computing, by the master controller, using the number of rollout regions and using a rollout distance, an integral distance traversed by the mobile torso; determining, by the master controller, using a measurement by the torso encoder, a fractional travel distance of the mobile torso; and calculating, by the master controller, using the integral distance and using the fractional distance, a total travel distance of the mobile torso.

A robotic torso sensing method includes: moving, by a master controller, a mobile robotic torso to a first end of travel, the mobile robotic torso being driven by a belt, the belt being driven by a drive pulley; storing, by a master controller, a measurement by a sensor of a position of the mobile robotic torso as a factory zero of the sensor; moving, by the master controller, the mobile torso to a second end of travel; counting, by the master controller, a number of rotations of the torso encoder; computing, by the master controller, using the number of rotations and using the factory zero, a travel distance of the mobile torso from the first end of travel to the second end of travel; dividing, by the master controller, the travel distance by the number of rotations to determine a rollout distance moved by the mobile torso when the drive pulley rotates one revolution; and storing, by the master controller, the rollout distance.

A robotic torso sensing method includes: receiving, by a master controller, from a sensor, a sensor measurement of a position of a mobile robotic torso; subtracting, by the master controller, a factory zero of the sensor from the sensor measurement to obtain an integral travel distance traversed by the mobile torso; dividing the integral travel distance, by the master controller, by a rollout distance of the sensor, generating a number of rollout regions traversed by the mobile torso; receiving, by the master controller, from a torso encoder, an encoder measurement of a position of the mobile torso; extracting, by the master controller, the fractional part of the encoder measurement, producing a fractional travel distance of the mobile torso; dividing, by the master controller, the fractional travel distance by the rollout distance to generate a rollout region fraction; determining, by the master controller, that the rollout region fraction is within an increment of an integer; subtracting, by the master controller, one from the number of rollout regions to generate a difference; multiplying, by the master controller, the difference by the rollout distance, obtaining a result; adding, by the master controller, the result to the rollout region fraction to generate a computed mobile torso position; and outputting, by the master controller, the computed torso position.

A robotic torso sensing method includes: receiving, by a master controller, from a sensor, a sensor measurement of a position of a mobile robotic torso; subtracting, by the master controller, a factory zero of the sensor from the sensor measurement to obtain an integral travel distance traversed by the mobile torso; dividing the integral travel distance, by the master controller, by a rollout distance of the sensor, generating a number of rollout regions traversed by the mobile torso; receiving, by the master controller, from a torso encoder, an encoder measurement of a position of the mobile torso; extracting, by the master controller, the fractional part of the encoder measurement, producing a fractional travel distance of the mobile torso; dividing, by the master controller, the fractional travel distance by the rollout distance to generate a rollout region fraction; determining, by the master controller, that the rollout region fraction is not within an increment of an integer; multiplying, by the master controller, the rollout region fraction by the rollout distance, obtaining a result; adding, by the master controller, the result to the rollout region fraction to generate a computed mobile torso position; and outputting, by the master controller, the computed torso position.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The robotic torso sensing system and method includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The robotic torso sensing system and method in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

According to embodiments of the invention, a robotic torso sensing system and method comprises a robotic torso, the torso comprising one or more of a mobile torso and a fixed torso; a motor configured to move the mobile torso; and a torso encoder configured to provide information to the motor. For example, the mobile torso comprises a sliding torso. For example, the mobile torso comprises a linearly sliding torso. For example, the mobile torso may be driven by a belt. For example, the mobile torso may be driven by a non-belt driver.

Embodiments of the invention relate to the control of the mobile torso by the master controller with position feedback. For example, the mobile torso comprises a linearly sliding torso that the master controller controls using feedback regarding a position of the mobile torso. For example, the feedback comprises a measurement by the sensor.

For example, the torso encoder is positioned on a drive pulley driving the belt. For example, the torso encoder comprises a position encoder. For example, the torso encoder comprises a rotary position encoder. For example, the torso encoder comprises a rotary Hall Effect position encoder. For example, the torso encoder comprises an absolute rotary position encoder. For example, the torso encoder comprises a rotary position encoder that is not an absolute rotary position encoder. For example, the torso encoder comprises a simple optical rotary encoder. For example, the torso encoder comprises another type of rotary position encoder. For example, the control program may then be more complex than when the torso encoder comprises an absolute rotary position encoder as the control program will initially only know a linear position of the mobile torso within a margin of error until the mobile torso is homed against one or more of an endstop and an optical interrupter located along the path of travel of the mobile torso.

For example, the robotic torso sensing system and method further comprises a master controller operably connected to the torso encoder, the master controller configured to control the robotic torso. For example, the master controller comprises a microprocessor. For example, the master controller is configured to decode an output of a sensor. For example, the master controller comprises a control program configured to integrate measurements from one or more sensors. For example, the torso controller is configured to derive an approximate position of the robotic torso.

According to other embodiments of the invention, the robotic torso sensing system and method further comprises a sensor configured to transmit measurements to the master controller. For example, the sensor comprises a distance sensor. For example, the sensor comprises an infrared distance sensor, such as those produced by Sharp Optoelectronics of Camas, Wash. (www.sharpsma.com). For example, the sensor measures distance using parallax. For example, the sensor measures a distance from the mobile torso to a target surface. For example, the sensor measures a distance from another robotic point of interest to a target surface. For example, the sensor is mounted parallel to an actuation direction. For example, the sensor comprises an inductive sensor configured to measure a change in inductance of a spring that expands and contracts with the mobile torso. For example, the sensor comprises an LDC1000 sensor, manufactured by Texas Instruments of Dallas, Tex. (www.ti.com). For example, the sensor operates using sonar. For example, the sensor comprises a capacitive sensor. The sensor does not have to have high precision and accordingly may cost, for example, between approximately $5 and approximately $10.

According to further embodiments of the invention, the sensor is attached to a frame of the robot. For example, the sensor is attached to a fixed frame of the robot. For example, the mobile torso moves the target surface. This arrangement facilitates direct coupling of the sensor to a master controller that controls the mobile torso without wires passing through the mobile torso. According to other embodiments of the invention, the target surface may be fixed and the sensor may move with the mobile torso.

According to still further embodiments of the invention, the drive pulley may make one or more revolutions during the throw of the mobile torso. If the drive pulley makes one revolution during the throw of the mobile torso, then the position of the mobile torso is known based on the position of the torso encoder.

According to a still further set of embodiments, a second encoder may be installed on the motor backshaft, allowing for a more accurate estimate of torso speed. For example, the second encoder comprises an absolute rotary position encoder. For example, the second encoder is configured to measure one or more of an angular position of the mobile torso and angular movement of the mobile torso.

According to yet another set of embodiments, the system may lift a robotic body part. For example, the system may lift a robotic torso. For example, the mobile torso may lift a robotic torso. For example, the mobile torso may lift a robotic arm. For example, the mobile torso may lift a robotic leg. For example, the mobile torso may lift a robotic head.

According to embodiments of the invention, a velocity of the motor is sensed using an encoder and the position of the mobile torso is determined using a combination of a sensor and a torso encoder. According to further embodiments of the invention, the combination of the sensor and the torso encoder is used to accurately control one or more of the position and velocity of the mobile torso. According to still further embodiments of the invention, the sensor gives a gross approximation of the location of the mobile torso. To increase the accuracy, the system comprises a high resolution absolute rotary position encoder, which allows for the system to determine a position of the mobile torso even after the system is powered off.

According to yet other embodiments of the invention, when the system is powered on, the control program may calculate an estimated position of the mobile torso as an estimated torso position calculated using position information provided by the sensor. The estimated torso position may be noisy. However, the estimated torso position is accurate enough to enable a determination of the number of rotations of the torso encoder. This has the effect of "unwrapping" the rotations onto the range of the sensor.

Figure 3:
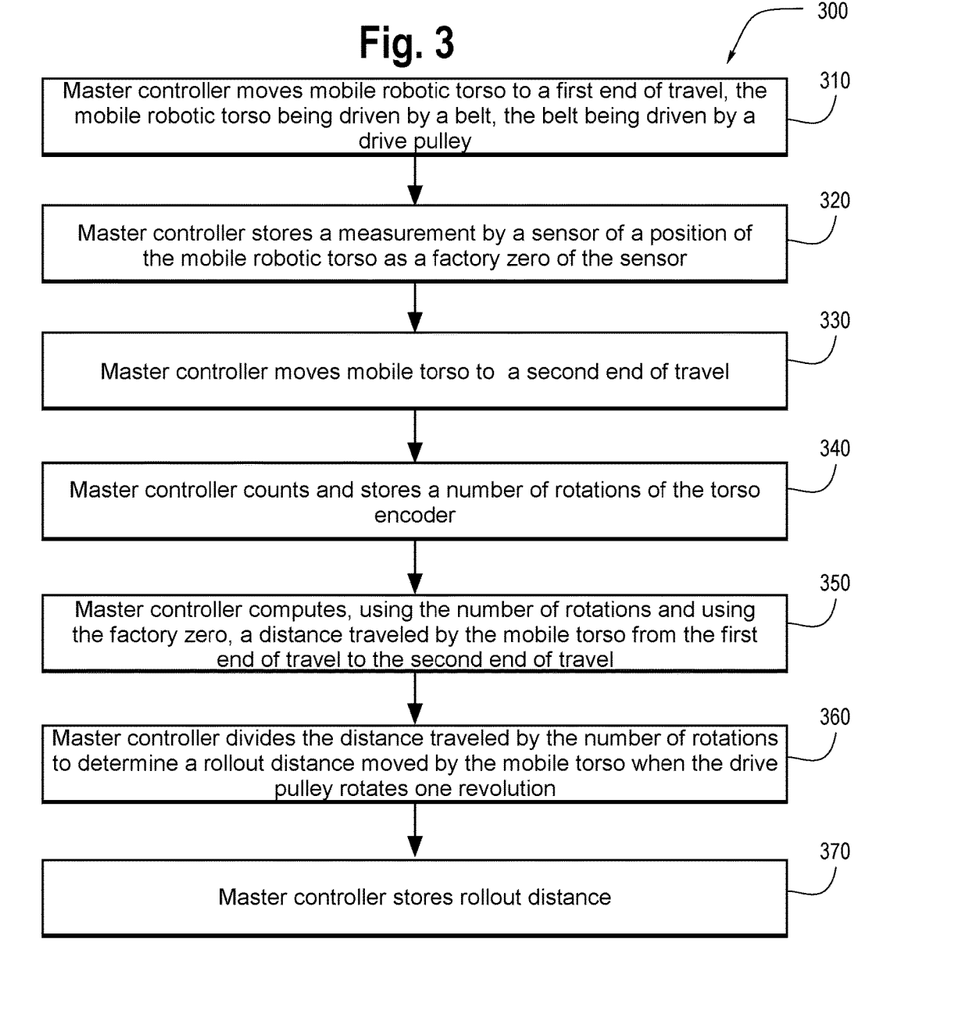
FIG. 3 is a flowchart of a robotic torso sensing method.

Factory calibration stores the values of both the sensor and the torso encoder at a bottom of travel to define a zero location of the linear mechanism. Then the mobile torso travels drives to an upper endstop of travel. The system records a number of rotations of the torso encoder. The torso encoder is attached to a pulley driving a belt. For each rotation of the pulley, the mobile torso moves a distance equivalent to a rollout distance. FIG. 3 below is a flow chart illustrating a representative sequence of steps for the unwrapping process.

Due to the stackup of tolerances in the sheet metal and machine components, a factory calibration may be performed. For example, factory calibration defines a factory zero of the sensor. For example, factory calibration defines a factory zero of the torso encoder. For example, the master controller performs a calibration by storing values recorded by one or more of the sensor and the torso encoder when the mobile torso is at a first end of travel. Then the system drives the mobile torso to a second end of travel, recording the number of rotations of the torso encoder. For each rotation of the drive pulley, the mobile torso moves a distance equivalent to the rollout distance.

By measuring the number of rotations from the bottom or travel to the top of travel, the total travel distance of the mechanism can be computed to the resolution of the torso encoder. The number of revolutions and total travel distance is stored as well for use during the location calculation.

Figure 4:
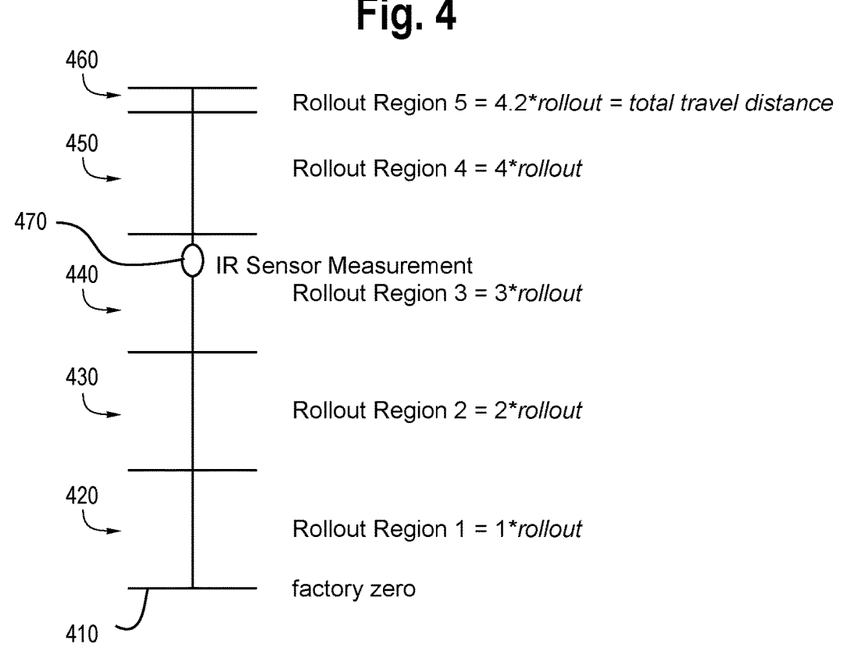
FIG. 4 is a line graph symbolically presenting a robotic torso sensing method used to determine a location of a mobile robotic torso.

To compute the location of the mobile torso, the sensor is used to measure the current distance. FIG. 4 below is a line graph representation of the algorithm.

Embodiments of the invention provide one or more of greater measurement accuracy and absolute measurement that is robust to the system being moved while powered off. Embodiments of the invention combine the sensor and the torso encoder to provide a high accuracy, low cost linear encoder.

According to additional embodiments of the invention, the control program may also access the value of a motor backshaft encoder to automatically determine gearing between the drive pulley and the backshaft encoder.

According to yet other embodiments of the invention, the gear ratio between the drive pulley and the motor backshaft may be low enough that the drive pulley need not be monitored by a torso encoder.

Figure 1A:
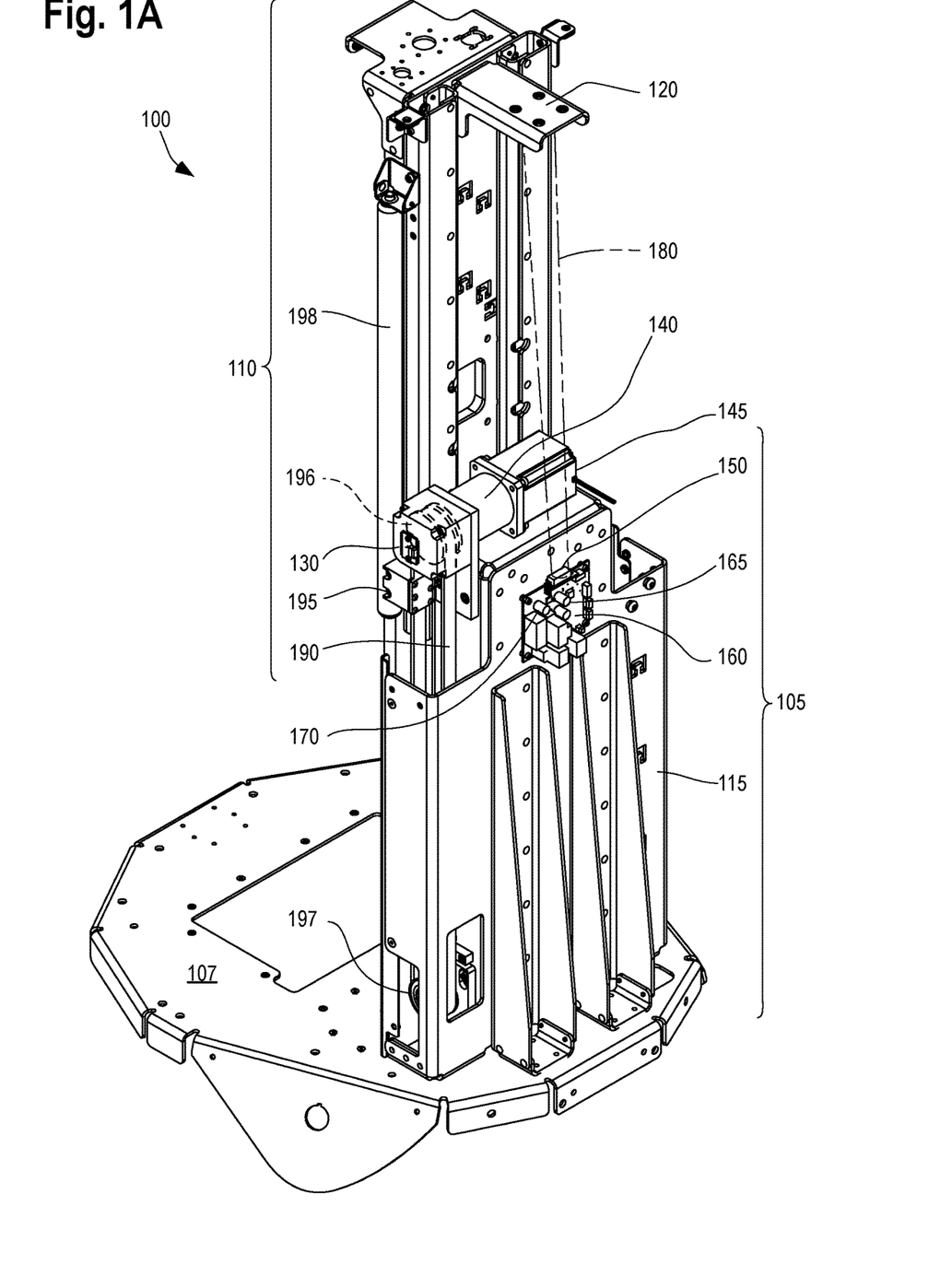
FIG. 1A is a drawing of a perspective rear view of a robotic torso sensing system with a mobile robotic torso in a raised position.

FIG. 1A is a drawing of a perspective rear view of a robotic torso sensing system. The robotic torso sensing system 100 comprises a fixed robotic torso 105 fastened to a base 107 and a mobile robotic torso 110. The fixed robotic torso 105 is stationary relative to the base 107. The mobile robotic torso 110 is mobile relative to the base 107. The fixed robotic torso 105 comprises a frame 115. The frame 115 comprises a linear rail (not visible in this figure) against which the mobile robotic torso 110 moves up and down.

In this perspective rear view, the mobile robotic torso 110 is in a raised position. The mobile robotic torso 110, which comprises a target surface 120. The fixed robotic torso 105 comprises a torso encoder 130, a motor 140, a motor encoder 145, a sensor 150, a master controller 160, a beam 180 emitted from the sensor 150 and hitting the target surface 120, a belt 190, a belt clamp 195, a drive pulley 196, and an idler pulley 197. The torso encoder is coupled to the drive pulley 196. Optionally, the system further comprises a computer (not shown) that is operably connected to the torso controller 165. The computer is configured to transmit an instruction to the torso controller 165 to initiate operation of the system 100. The motor encoder 145 measures the angular position of the motor 140.

The master controller 160 is configured to control the movement of the motor 140. The master controller 160 performs efficient torque control of the motor 140. The master controller 160 is further configured to calculate a velocity of the motor 140. The master controller 160 is further configured to control the movement of the mobile robotic torso 110. Alternatively, or additionally, the system 100 comprises two separate controllers, a torso controller 165 configured to control the mobile robotic torso 110, and a motor controller 170 configured to control the motor 140, the motor controller 170 configured to calculate a velocity of the motor 140, the motor controller further configured to perform torque control of the motor 140. The torso controller 165 and the motor controller 170 are operably connected. Alternatively, or additionally, the master controller 160 comprises one or more of the torso controller 165 and the motor controller 170. For example, the torso controller 165 sends instructions to the motor controller 170 to ensure proper torque control of the motor 140. For example, using the instructions received from the torso controller 165, the motor controller 170 controls a torque of the motor 140. For example, the motor controller 170 calculates a relatively precise velocity of the motor 140.

The torso controller 165 uses one or more of the torso encoder 130 and the sensor 150 to determine a current location of the mobile torso 110. Using the current location, the torso controller 165 computes a motor command needed to achieve a target position of the mobile torso 110. The motor controller 170 uses input from one or more of the torso encoder 130 and the sensor 150 to determine a current needed to move the motor 140 to achieve a desired movement in the mobile torso 110.

One or more of the torso controller 165 and the motor controller 170 run on the master controller 160. For example, the master controller 160 comprises a motor controller board configured to control the mobile torso 110. For example, the controller 160 is further configured to receive a command from the optional computer. For example, the command may comprise the target position of the mobile torso 110.

The mobile robotic torso is clamped to the belt 190 by the belt clamp 195.

The torso encoder 130 is configured to detect a position of the target surface 120. The sensor 150 is configured to detect the position of the target surface 120 and thereby to detect the position of the mobile torso 110. Typically, although not necessarily, the fixed robotic torso 105 comprises the torso encoder 130, the motor 140, the motor encoder 145, the sensor 150, the master controller 160, and the belt 190. Typically, although not necessarily, the mobile robotic torso 110 comprises the target surface 120.

For example, the torso encoder 130 comprises a magnetic encoder 130. For example, the torso encoder 130 comprises a non-magnetic encoder 130. A typical accuracy of the torso encoder 130 is better than approximately one millimeter. A typical accuracy of the sensor 150 is between approximately one centimeter and approximately one inch.

For example, the sensor 150 comprises an optical sensor 150. For example, the sensor 150 comprises a non-optical sensor 150. For example, the sensor 150 uses a beam of light to measure the distance to the target surface 120.

The fixed torso 105 comprises the drive pulley 196 that drives the belt 190 and the idler pulley 197 at approximately an opposite end of the belt 190 from the drive pulley 196, the idler pulley 197 configured to keep the belt 190 in tension. The idler pulley 197 commonly, although not necessarily, comprises a passive pulley on bearings. The idler pulley 197 commonly, although not necessarily, moves with the drive pulley 196. The belt 190 is fixed to the mobile robotic torso 110. The belt 190 moves up or down by a rollout distance when the mobile robotic torso 110 traverses the rollout distance. The belt 190 in turn moves the mobile robotic torso 110 up and down. The torso encoder 130 measures a number of revolutions turned by the drive pulley 196. This measurement enables the master controller 160 to calculate a travel distance traveled of the belt 190. The sensor 150 tells us what region of rotations we are in and uses this to compute an actual position of the mobile robotic torso 110.

Typically, although not necessarily, the motor 140 comprises a gear box (not shown) so as to create a gear ratio between the motor 140 and the drive pulley 196. For example, the gear ratio is approximately 10:1. For example, this means that for each 1,000 times that the motor 140 rotates, the drive pulley 196 rotates approximately 100 times.

Also included in the diagram is an optional spring 198. For example, the spring 198 comprises a gas spring 198. For example, the spring 198 comprises a non-gas spring 198. Typically, although not necessarily, where present, the mobile robotic torso 110 comprises the optional spring 198.

The optional spring 198 may comprise a gas spring 198 configured to move up and down as the mobile torso 110 moves up and down. The optional spring 198 helps cushion the movement of the mobile torso 110. For example, the spring 198 is filled with gas. For example, the spring 198 is filled with compressed air. For example, the spring 198 is filled with a gas other than compressed air. The spring 198 is configured to exert pressure to counterbalance a weight of the mobile torso 110. For example, the spring 198 is tuned so that it exerts approximately the same pressure upwards on the mobile torso 110 as the weight of the mobile torso 110. For example, the spring 198 partially counterbalances the weight of the mobile torso 110, thereby slowing a rate of its descent following its release by a turning off of the motor 140 acting under instructions of the master controller 160. For example, the spring 198 fully counterbalances the weight of the mobile torso 110, stopping its descent following its release and thereby keeping the mobile torso 110 in an elevated position relative to the fixed torso 105.

Figure 1B:
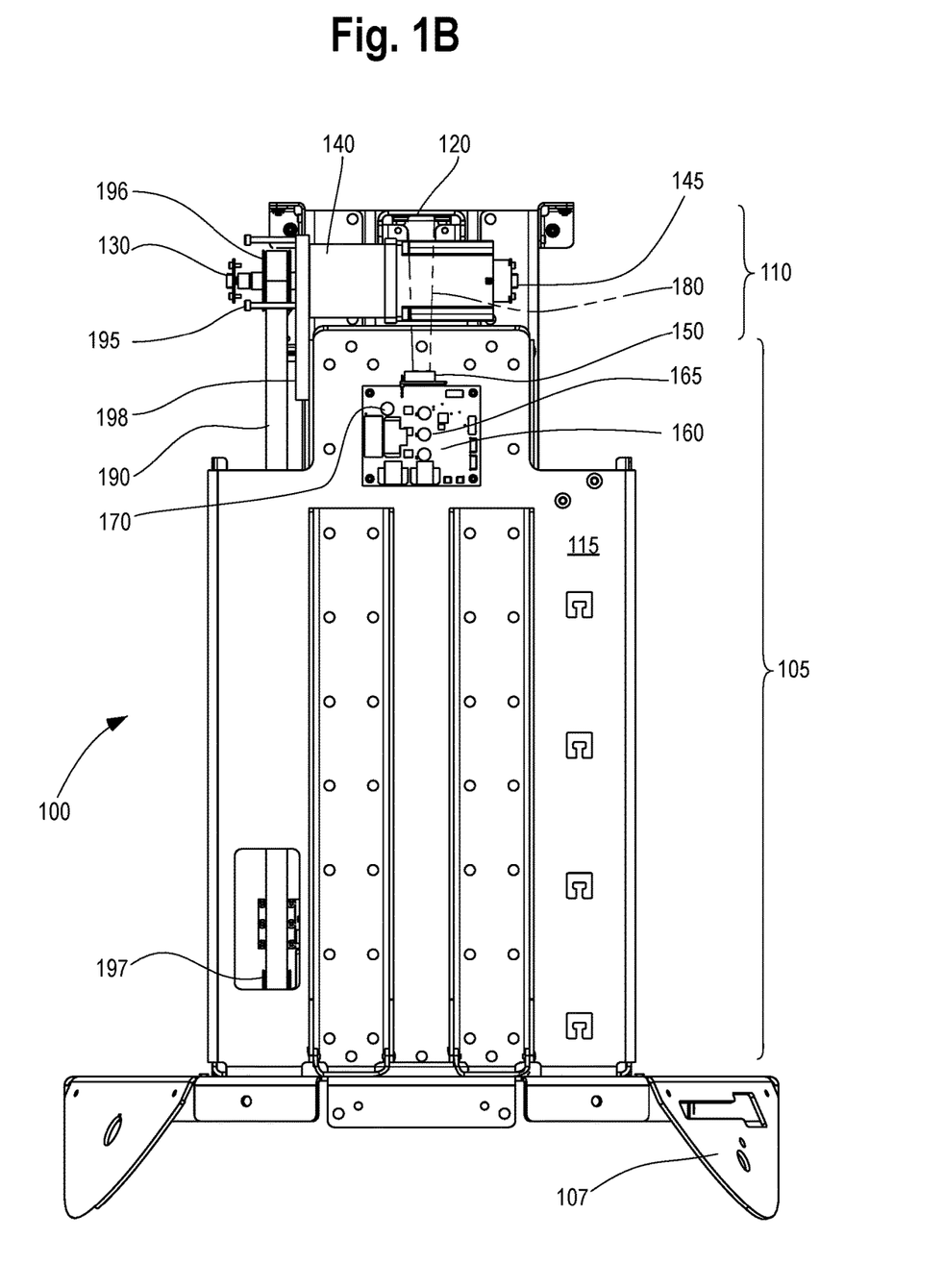
FIG. 1B is a drawing of a rear view of the robotic torso sensing system with the mobile robotic torso in a lowered position.

FIG. 1B is a drawing of a rear view of the robotic torso sensing system 100 with the mobile robotic torso 110 in a lowered position. The robotic torso sensing system 100 again comprises the fixed robotic torso 105, the base 107, the mobile robotic torso 110, the frame 115, the target surface 120, the torso encoder 130, the motor 140, the motor encoder 145, the sensor 150, the master controller 160, the beam 180, the belt 190, the belt clamp 195, the drive pulley 196, the idler pulley 197, and the optional spring 198.

Figure 1C:
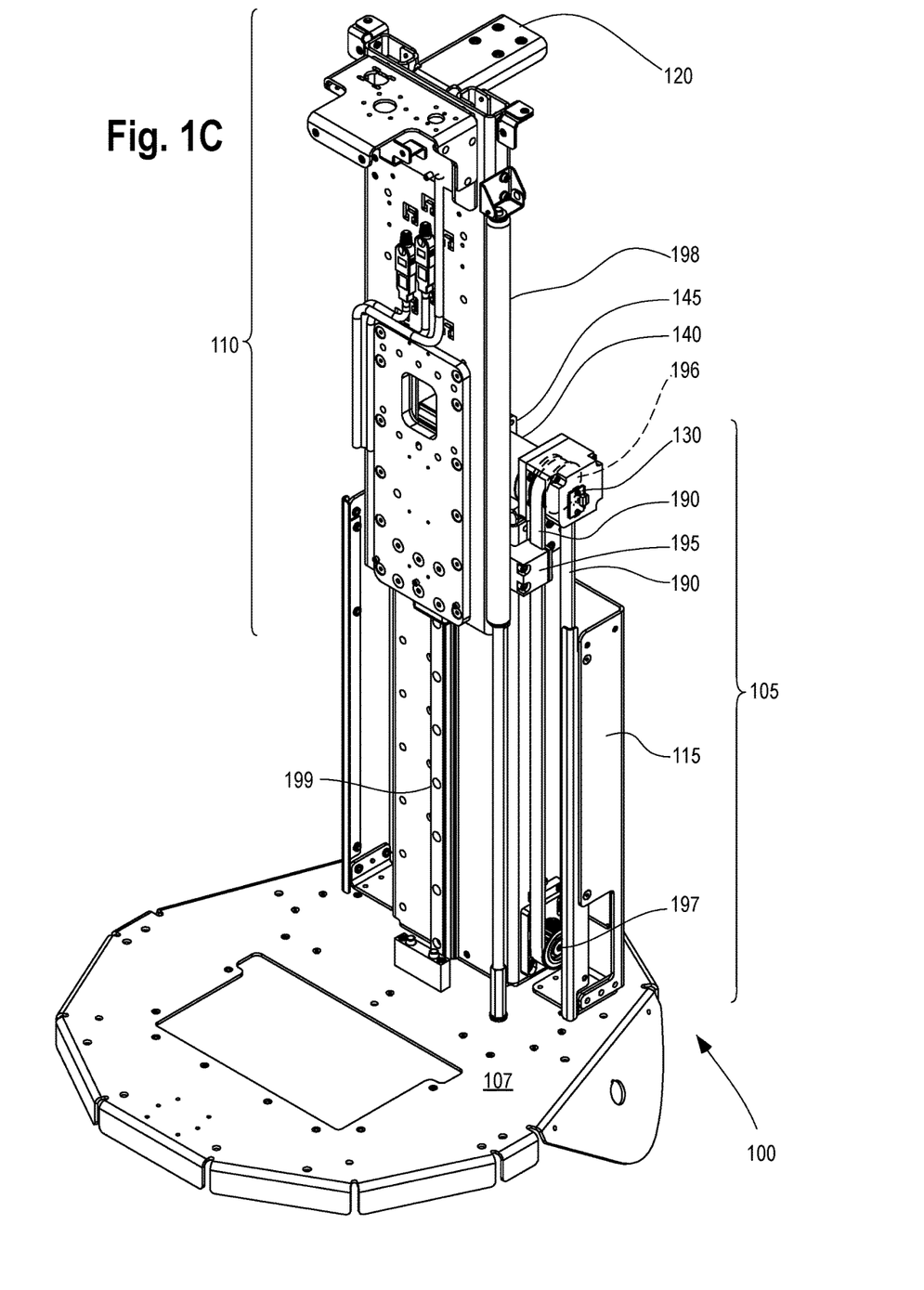
FIG. 1C is a drawing of a perspective front view of the robotic torso sensing system with the mobile robotic torso in a raised position.

FIG. 1C is a drawing of a perspective front view of a robotic torso sensing system 100 with the mobile robotic torso 110 in a raised position. The robotic torso sensing system 100 again comprises the fixed robotic torso 105, the base 107, the mobile robotic torso 110, the frame 115, the target surface 120, the torso encoder 130, the motor 140, the motor encoder 145, the belt 190, the belt clamp 195, the drive pulley 196, the idler pulley 197, and the optional spring 198. In this view, the sensor 150, the master controller 160, the torso controller 165, and the motor controller 170 are not visible. In this view, a linear rail 199 is visible. The frame 115 comprises the linear rail 199. The mobile torso 110 is configured to move on the linear rail 199. For example, the mobile torso 110 is configured to slide up and down on the linear rail 199.

Figure 2A:
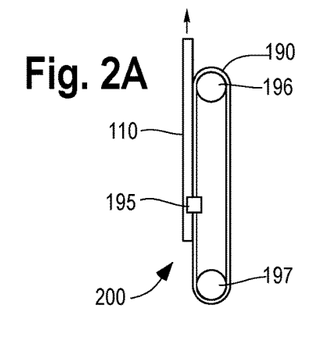
FIGS. 2A-2B are a pair of detail drawings showing the operation of the robotic torso sensing system.
Figure 2B:
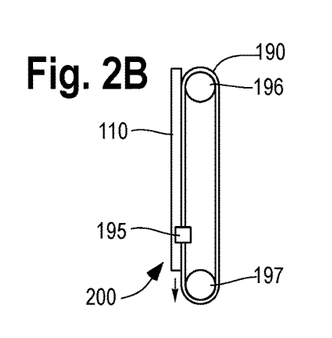

FIGS. 2A-2B are a pair of detail drawings showing the operation of the robotic torso sensing system 200. In this detail view of the system 200, included are the mobile torso 110, the belt 190, the belt clamp 195, the drive pulley 196, and the idler pulley 197.

The mobile torso 110 is moved by a linear mechanism driven by the belt 190, as the motor (item 140 in FIGS. 1A-1C; not shown in this figure) rotates the belt 190 to perform one or more of raising and lowering the mobile torso 110 along the linear rail (item 199 in FIG. 1C; not shown in this figure) comprised in the fixed robotic torso (item 105 in FIGS. 1A-1C; not shown in this figure).

As shown in FIG. 2A, as the drive pulley 196 is rotated clockwise, the mobile torso 110 rises. The drive pulley 196 drives the belt 190. The idler pulley 197 keeps the belt 190 in tension. The idler pulley 197 commonly, although not necessarily, comprises a passive pulley on bearings. The idler pulley 197 commonly, although not necessarily, moves with the drive pulley 196. The belt 190 is fixed to the mobile robotic torso 110. The belt 190 moves up or down by a rollout distance when the mobile robotic torso 110 traverses the rollout distance. The belt 190 in turn moves the mobile robotic torso 110 up and down.

As shown in FIG. 2B, as the drive pulley 196 is rotated counterclockwise, the mobile torso 110 is lowered.

By measuring the number of rotations from the bottom or travel to the top of travel, the total travel distance of the mechanism can be computed to the resolution of the torso encoder. The number of revolutions and total travel distance is stored as well for use during the location calculation.

According to further embodiments of the invention, the control program performs the unwrapping by manually moving the mobile torso to one end of the travel, manually informing the control program that the mobile torso has reached the end, and then manually moving the mobile torso to the other end of travel. This process allows the control program to learn the mapping between distance sensor values and torso encoder values. FIG. 3 is a flow chart illustrating steps in such a control program.

FIG. 3 is a flowchart of a robotic torso sensing method 300. The order of the steps in the method 300 is not constrained to that shown in FIG. 3 or described in the following discussion. Several of the steps could occur in a different order without affecting the final result.

In step 310, a master controller moves a mobile robotic torso to a first end of travel. For example, the torso controller moves the mobile torso to a bottom of travel. Block 310 then transfers control to block 320.

In step 320, the master controller records and stores a measurement by the sensor of a position of the mobile robotic torso. These measurements comprise a factory zero of the sensor. Block 320 then transfers control to block 330.

In step 330, the master controller moves the mobile torso to a second end of travel. For example, the master controller moves the mobile torso to a top of travel. Block 330 then transfers control to block 340.

In step 340, the master controller counts and stores a number of rotations of the torso encoder. Block 340 then transfers control to block 350.

In step 350, the master controller, using the number of rotations and using the factory zero of the sensor, computes a travel distance of the mobile torso from the first end of travel to the second end of travel. For example, the master controller computes the travel distance of the mobile torso from the bottom of travel to the top of travel. Block 350 then transfers control to block 360.

In step 360, the master controller divides the travel distance by the number of rotations to determine a rollout distance moved by the mobile torso when the drive pulley rotates one revolution. Block 360 then transfers control to block 370.

In step 370, the master controller stores the rollout distance. Block 370 then terminates the process.

According to other embodiments of the invention, one or more of the rollout distance and the travel distance can be known based on mechanical characteristics of the system without a need for measurement.

FIG. 4 is a line graph 400 symbolically presenting a robotic torso sensing method used to determine a location of a mobile robotic torso.

Depicted are a factory zero 410, first rollout region 420, second rollout region 430, third rollout region 440, fourth rollout region 450, and fifth rollout region 460. The sensor measures a position of the robotic torso, generating a measurement 470. The sensor determines that the robotic torso is currently located in the fifth rollout region 460. The number of full rollout regions traversed is equivalent to a number of full rotations completed by the drive pulley. The torso encoder determines that a fractional travel distance is the fractional travel distance, 0.2 of a rollout region. Combining the measurements of the torso encoder and the sensor, the master controller determines that a travel distance comprises a sum of an integral travel distance comprising four full rollout regions traversed, plus the fractional travel distance comprising 0.2 of a rollout region, for a total travel distance of 4.2 times the rollout distance. FIG. 3 presents a representative method for determining the rollout distance.

Figure 5:
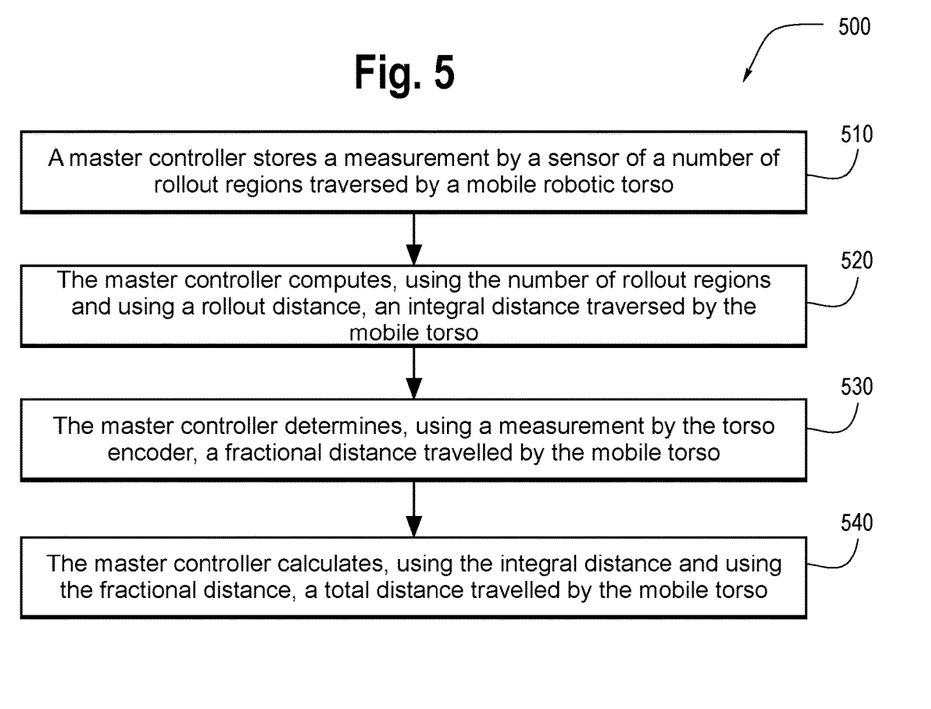
FIG. 5 is a flowchart of a robotic torso sensing method.

FIG. 5 is a flowchart of a robotic torso sensing method 500. The order of the steps in the method 500 is not constrained to that shown in FIG. 5 or described in the following discussion. Several of the steps could occur in a different order without affecting the final result.

In step 510, a master controller stores a measurement by a sensor of a number of rollout regions traversed by a mobile robotic torso. The number of rollout regions is equivalent to a number of full rotations completed by the drive pulley. Block 510 then transfers control to block 520.

In step 520, the master controller computes, using the number of rollout regions and using a rollout distance, an integral distance traversed by the mobile torso. Block 520 then transfers control to block 530. FIG. 3 presents a representative method for determining the rollout distance.

In step 530, the master controller determines, using a measurement by the torso encoder, a fractional travel distance of the mobile torso. Block 530 then transfers control to block 540.

In step 540, the master controller calculates, using the integral travel distance and using the fractional travel distance, a total travel distance of the mobile torso. Block 540 then terminates the process.

Figure 6:
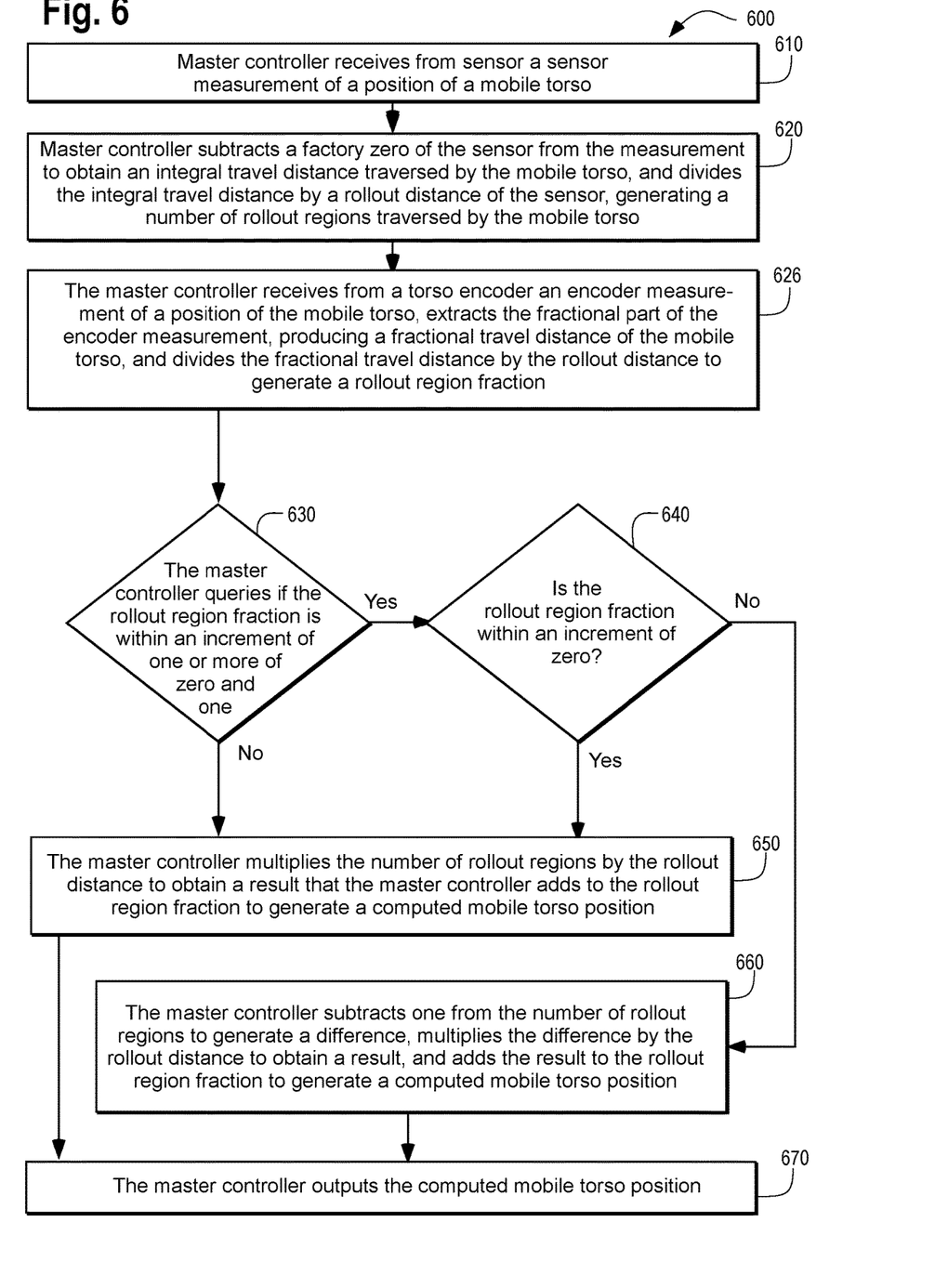
FIG. 6 is a flowchart of a robotic torso sensing method.

FIG. 6 is a flowchart of a robotic torso sensing method 600. The order of the steps in the method 600 is not constrained to that shown in FIG. 6 or described in the following discussion. Several of the steps could occur in a different order without affecting the final result.

In step 610, a master controller receives from a sensor a sensor measurement of a position of a mobile torso. Block 610 then transfers control to block 620.

In step 620, the master controller subtracts a factory zero of the sensor from the sensor measurement to obtain an integral travel distance traversed by the mobile torso, and divides the integral travel distance by a rollout distance of the sensor, generating a number of rollout regions traversed by the mobile torso. Block 620 then transfers control to block 626.

In step 626, the master controller receives from a torso encoder an encoder measurement of a position of the mobile torso. If necessary, the master controller subtracts an encoder factory zero from the encoder measurement to normalize the encoder measurement. The master controller extracts the fractional part of the encoder measurement, producing a fractional travel distance of the mobile torso. The fractional travel distance comprises a distance travelled by the mobile torso in a current rollout region. The master controller divides the fractional travel distance by the rollout distance to generate a rollout region fraction. Block 626 then transfers control to block 630.

In step 630, the master controller queries if the rollout region fraction is within an increment of one or more of zero and one. For example, the increment is set by a user. For example, the increment is set by the master controller. For example, the increment is calculated by the torso controller. For example, the increment is 0.1. For example, the increment is 0.05. For example, the increment is zero.

If the answer is yes, block 630 then transfers control to block 640. If the answer is no, block 630 then transfers control to block 650.

In step 640, the master controller queries if the rollout region fraction is within an increment of zero. If no, block 640 then transfers control to block 660. If yes, block 640 then transfers control to block 650.

In step 650, the master controller multiplies the number of rollout regions by the rollout distance to obtain a result that the master controller adds to the rollout region fraction to generate a computed mobile torso position. Block 650 then transfers control to block 670.

In step 660, the master controller subtracts one from the number of rollout regions to generate a difference, multiplies the difference by the rollout distance to obtain a second product, and adds the second product to the rollout region fraction to generate a computed mobile torso position. Block 660 then transfers control to block 670.

In step 670, the master controller outputs the computed mobile torso position. Block 670 then terminates the process.

Figure 7:
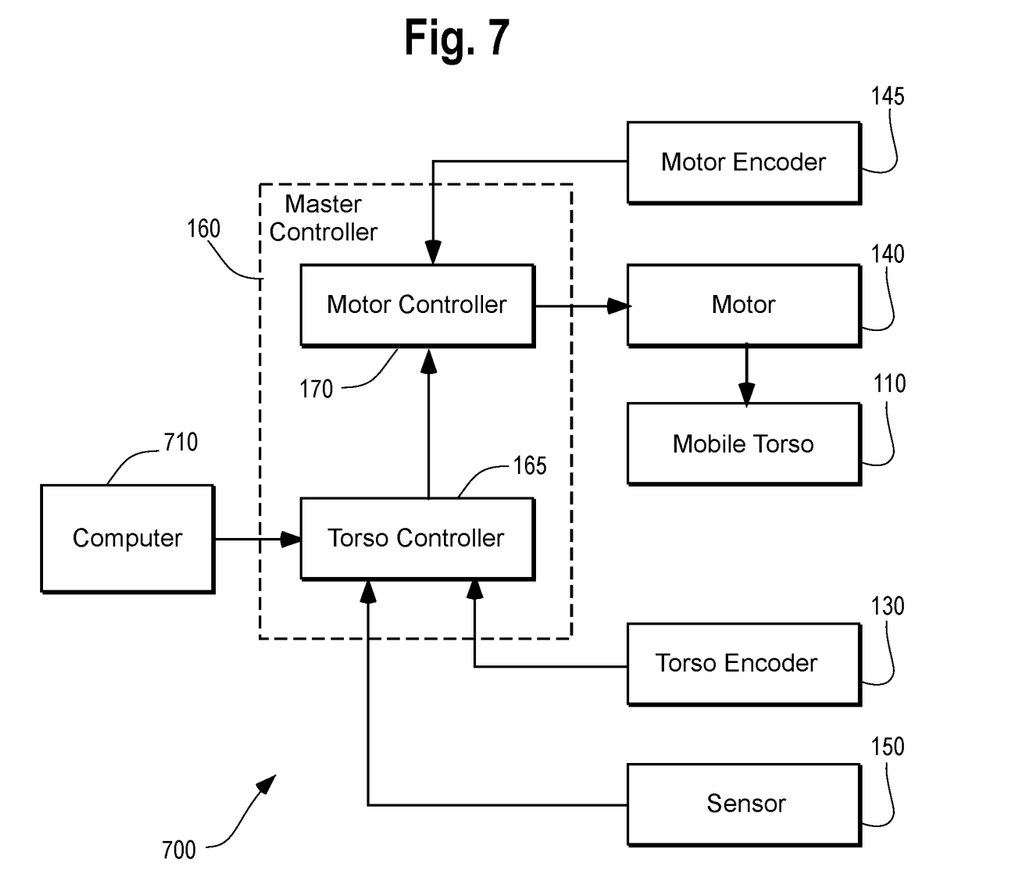
FIG. 7 is a block diagram of a robotic torso sensing system.

FIG. 7 is a block diagram of a robotic torso sensing system 700. FIG. 7 shows the relationship of the controllers with hardware components. The system 700 comprises a computer 710, the master controller 160, the motor encoder 145, the motor 140, the mobile torso 110, the torso encoder 130, and the sensor 150.

The master controller 160 comprises the motor controller 170. The master controller 160 further comprises the torso controller 165. The computer 710 is operably connected to the torso controller 165. The motor controller 170 is operably connected to the motor 140. The motor controller 165 is further operably connected to the motor encoder 145. The motor controller 170 is further operably connected to the torso controller 165. The motor 140 is further operably connected to the mobile torso 110.

The torso controller 165 is further operably connected to the torso encoder 130. The torso controller 165 is further operably connected to the sensor 150.

Typically, although not necessarily, the torso controller 165 comprises a software entity, as opposed to a physical entity. Typically, although not necessarily, the motor controller 170 comprises a software entity, as opposed to a physical entity. Typically, although not necessarily, the motor encoder 145 comprises a physical entity, as opposed to a software entity. Typically, although not necessarily, the motor 140 comprises a physical entity, as opposed to a software entity. Typically, although not necessarily, the mobile torso 110 comprises a physical entity, as opposed to a software entity. Typically, although not necessarily, the torso encoder 130 comprises a physical entity, as opposed to a software entity. Typically, although not necessarily, the sensor comprises a physical entity, as opposed to a software entity.

Embodiments of this invention relate in general to a torso sensing system and method, and more particularly to a robotic torso sensing system and method.

Advantages of embodiments of the invention include lower cost, longer lifetime relative to a linear potentiometer, and that embodiments of the invention offers a no contact solution. The factory calibration helps ameliorate a stackup of tolerances in one or more of sheet metal and machine components.

Another advantage of embodiments of the invention is they offer a new solution to a problem created by the fact that encoders and sensors typically only work when the robot is turned on. A location of a torso will not be known if the mobile torso moves while the robot is turned off. Embodiments of the invention avoid the need for a potentially dangerous calibration procedure in which the drive mechanism is driven to an extreme position or past a calibration flag. Another advantage is that the need for a startup procedure is avoided or minimized.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. Other representative embodiments can be implemented using one or more of different configurations and different components.

For example, it will be understood by those skilled in the art that software used by the robotic torso sensing system and method may be located in any location in which it may be accessed by the system. For example, it will be understood by one of ordinary skill in the art that the order of certain fabrication steps and certain components can be altered without substantially impairing the functioning of the invention. It is intended, therefore, that the subject matter in the above description shall be interpreted as illustrative and shall not be interpreted in a limiting sense.

What is claimed is:

1. A robotic torso sensing system, comprising:
   a robotic torso comprising a mobile torso, the robotic torso further comprising a fixed torso;
   a motor configured to move the mobile torso;
   a torso encoder configured to provide information to the motor;
   a master controller operably connected to the motor, the master controller configured to control the motor, the master controller operably connected to the torso encoder, the master controller further configured to control the mobile torso; and
   a sensor configured to measure a position of the mobile torso, the sensor further configured to transmit the measurement to the master controller.

2. The system of claim 1, wherein the master controller controls a torque of the motor.

3. The system of claim 1, wherein the master controller is further configured to calculate a velocity of the motor.

4. The system of claim 1, wherein the master controller is further configured to control the movement of the mobile robotic torso.

5. The system of claim 1, wherein the master controller is further configured to determine a current location of the mobile torso using input from one or more of the torso encoder and the sensor.

6. The system of claim 5, wherein the master controller is further configured, using the current location, to compute a motor command needed to achieve a target position of the mobile torso.

7. The system of claim 1, wherein the fixed torso comprises the torso encoder, the motor, the sensor, and the master controller.

8. The system of claim 1, wherein the fixed torso is attached to a base.

9. The system of claim 1, wherein the sensor comprises an optical sensor.

10. The system of claim 1, wherein the measurement comprises a distance from the mobile torso to a target surface.

11. The system of claim 1, wherein the mobile torso comprises the target surface.

12. The system of claim 1, wherein the fixed torso further comprises a belt configured to drive the mobile torso.

13. The system of claim 12, wherein the fixed robotic torso further comprises a drive pulley that drives the belt.

14. The system of claim 13, wherein the torso encoder is coupled to the drive pulley.

15. The system of claim 13, wherein the drive pulley drives the belt.

16. The system of claim 15, further comprising an idler pulley configured to keep the belt in tension.

17. The system of claim 16, wherein the idler pulley is located at approximately an opposite end of the belt from the drive pulley.

18. The system of claim 1, wherein the mobile torso moves on a linear rail.

19. The system of claim 18, wherein the fixed torso comprises the linear rail.

20. The system of claim 18, wherein the master controller controls the mobile torso using feedback regarding a position of the mobile torso.

21. The system of claim 20, wherein the feedback comprises a measurement by the sensor.

22. The system of claim 1, wherein the torso encoder comprises a position encoder.

23. The system of claim 1, wherein the master controller is configured to decode an output of a sensor.

24. The system of claim 1, further comprising a motor encoder configured to measure an angular position of the motor.

25. The system of claim 24, wherein the master controller is further configure to uses input from one or more of the torso encoder and the sensor to determine a current needed to move the motor to achieve a desired movement in the mobile torso.

26. The system of claim 1, wherein the master controller comprises one or more of a torso controller configured to control the mobile torso and a motor controller configured to control the motor.

27. The system of claim 26, wherein the master controller comprises the torso controller and the motor controller.

28. The system of claim 27, wherein the torso controller is operably connected with the motor controller.

29. The system of claim 1, wherein the mobile torso further comprises a spring.

30. The system of claim 29, wherein the spring comprises a gas spring.

31. The system of claim 29, wherein the spring is configured to exert pressure to counterbalance a weight of the mobile torso.

32. The system of claim 31, wherein the spring is tuned so that it exerts approximately the same pressure upwards on the mobile torso as the weight of the mobile torso.

33. The system of claim 31, wherein the spring partially counterbalances the weight of the mobile torso, thereby slowing a rate of its descent.

34. The system of claim 31, wherein the spring fully counterbalances the weight of the mobile torso, stopping its descent and keeping the mobile torso in an elevated position relative to the fixed torso.

35. The system of claim 1, wherein the master controller comprises a motor controller operably connected to the motor, the motor controller configured to control the motor, and wherein the master controller further comprises a torso controller operably connected to the torso encoder, the torso controller operably connected to the motor controller, the torso controller configured to control the mobile torso.

36. The system of claim 1, wherein the master controller is configured, when the system is powered on, to calculate an estimated position of the mobile torso using a sensor measurement.

37. The system of claim 1, further comprising a computer that is operably connected to the master controller.

38. The system of claim 37, wherein the computer is configured to transmit an instruction to the master controller to initiate operation of the system.

39. A robotic torso sensing system, comprising:
a robotic torso comprising a mobile torso, the robotic torso further comprising a fixed torso;
a motor configured to move the mobile torso;
a motor controller operably connected to the motor, the motor controller configured to control the motor;
a torso encoder configured to provide information to the motor;
a torso controller operably connected to the torso encoder, the torso controller operably connected to the motor controller, the torso controller configured to control the mobile torso; and
a sensor configured to measure a position of the mobile torso, the sensor further configured to transmit the measurement to the torso controller.

40. A robotic torso sensing method, comprising:
storing, by a master controller, a measurement by a sensor of a number of rollout regions traversed by a mobile robotic torso;
computing, by the master controller, using the number of rollout regions and using a rollout distance, an integral distance traversed by the mobile torso;
determining, by the master controller, using a measurement by the torso encoder, a fractional travel distance of the mobile torso; and
calculating, by the master controller, using the integral distance and using the fractional distance, a total travel distance of the mobile torso.

41. The method of claim 40, wherein computing comprises multiplying the number of rollout regions by the rollout distance.

42. The method of claim 40, wherein calculating comprises adding the integral distance to the fractional distance.

43. A robotic torso sensing method, comprising:
moving, by a master controller, a mobile robotic torso to a first end of travel, the mobile robotic torso being driven by a belt, the belt being driven by a drive pulley;
storing, by a master controller, a measurement by a sensor of a position of the mobile robotic torso as a factory zero of the sensor;
moving, by the master controller, the mobile torso to a second end of travel;
counting, by the master controller, a number of rotations of the torso encoder;
computing, by the master controller, using the number of rotations and using the factory zero, a travel distance of the mobile torso from the first end of travel to the second end of travel;
dividing, by the master controller, the travel distance by the number of rotations to determine a rollout distance moved by the mobile torso when the drive pulley rotates one revolution; and
storing, by the master controller, the rollout distance.

44. The method of claim 43, wherein the first end of travel comprises a bottom of travel.

45. The method of claim 43, wherein the second end of travel comprises a top of travel.

46. A robotic torso sensing method, comprising:
receiving, by a master controller, from a sensor, a sensor measurement of a position of a mobile robotic torso;
subtracting, by the master controller, a factory zero of the sensor from the sensor measurement to obtain an integral travel distance traversed by the mobile torso;
dividing the integral travel distance, by the master controller, by a rollout distance of the sensor, generating a number of rollout regions traversed by the mobile torso;
receiving, by the master controller, from a torso encoder, an encoder measurement of a position of the mobile torso;
extracting, by the master controller, the fractional part of the encoder measurement, producing a fractional travel distance of the mobile torso;
dividing, by the master controller, the fractional travel distance by the rollout distance to generate a rollout region fraction;
determining, by the master controller, that the rollout region fraction is within an increment of an integer;
subtracting, by the master controller, one from the number of rollout regions to generate a difference;
multiplying, by the master controller, the difference by the rollout distance, obtaining a result;
adding, by the master controller, the result to the rollout region fraction to generate a computed mobile torso position; and
outputting, by the master controller, the computed torso position.

47. The method of claim 46, wherein the factory zero comprises a sensor measurement at a first end of travel of the mobile torso.

48. The method of claim 46, further comprising an additional step, performed after the dividing step and before the determining step, of:

calculating an increment, by the master controller.

49. A robotic torso sensing method, comprising:

receiving, by a master controller, from a sensor, a sensor measurement of a position of a mobile robotic torso;

subtracting, by the master controller, a factory zero of the sensor from the sensor measurement to obtain an integral travel distance traversed by the mobile torso;

dividing the integral travel distance, by the master controller, by a rollout distance of the sensor, generating a number of rollout regions traversed by the mobile torso;

receiving, by the master controller, from a torso encoder, an encoder measurement of a position of the mobile torso;

extracting, by the master controller, the fractional part of the encoder measurement, producing a fractional travel distance of the mobile torso;

dividing, by the master controller, the fractional travel distance by the rollout distance to generate a rollout region fraction;

determining, by the master controller, that the rollout region fraction is not within an increment of an integer;

multiplying, by the master controller, the rollout region fraction by the rollout distance, obtaining a result;

adding, by the master controller, the result to the rollout region fraction to generate a computed mobile torso position; and outputting, by the master controller, the computed torso position.

50. The method of claim 49, wherein the factory zero comprises a sensor measurement at a first end of travel of the mobile torso.

51. The method of claim 49, further comprising an additional step, performed after the dividing step and before the determining step, of:

calculating an increment, by the master controller.

* * * * *

UNITED STATES PATENT AND TRADEMARK OFFICE
CERTIFICATE OF CORRECTION

PATENT NO. : 9,827,669 B2  
APPLICATION NO. : 15/135449  
DATED : November 28, 2017  
INVENTOR(S) : Michael Ferguson

Page 1 of 1

It is certified that error appears in the above-identified patent and that said Letters Patent is hereby corrected as shown below:

On the Title Page

Please add a "Related U.S. Application Data" section with the following text: "Provisional application No. 62/150,384, filed on April 21, 2015."

Signed and Sealed this
Eighteenth Day of February, 2025

Coke Morgan Stewart
*Acting Director of the United States Patent and Trademark Office*